G. J. ARNOLD.
WHEEL HAVING DETACHABLE RIM.
APPLICATION FILED SEPT. 30, 1911.

1,039,348.

Patented Sept. 24, 1912.

Witnesses.
E. B. Franzoni.
C. P. Early.

Inventor.
G. J. Arnold
By his attorneys
Buckwin Wight

UNITED STATES PATENT OFFICE.

GILBERT JAMES ARNOLD, OF TORQUAY, ENGLAND.

WHEEL HAVING DETACHABLE RIM.

1,039,348.  Specification of Letters Patent.  Patented Sept. 24, 1912.

Application filed September 30, 1911. Serial No. 652,078.

*To all whom it may concern:*

Be it known that I, GILBERT JAMES ARNOLD, a subject of the King of Great Britain, residing at "Toorak," Torquay, in the county of Devon, England, have invented new and useful Improvements in Wheels Having Detachable Rims, of which the following is a specification.

According to this invention the felly of the wheel has flats formed on it while the detachable rim is thickened in places by means of segmental blocks fixed inside it to form corresponding flats, the rim being fixed in place by bolts screwing into the felly and engaging with holes in the thickened parts of the rim. In the case of a wooden felly the bolts screw into sleeves passing through it. The sleeves are rigidly secured to the band (or periphery of the fixed part of the wheel) and are also further secured in the case of wooden wheels by plates fixed inside the felly. The detachable rim is provided with an inwardly projecting nozzle which engages with a hole through the felly and is adapted to receive the pneumatic valve.

Figure 1:
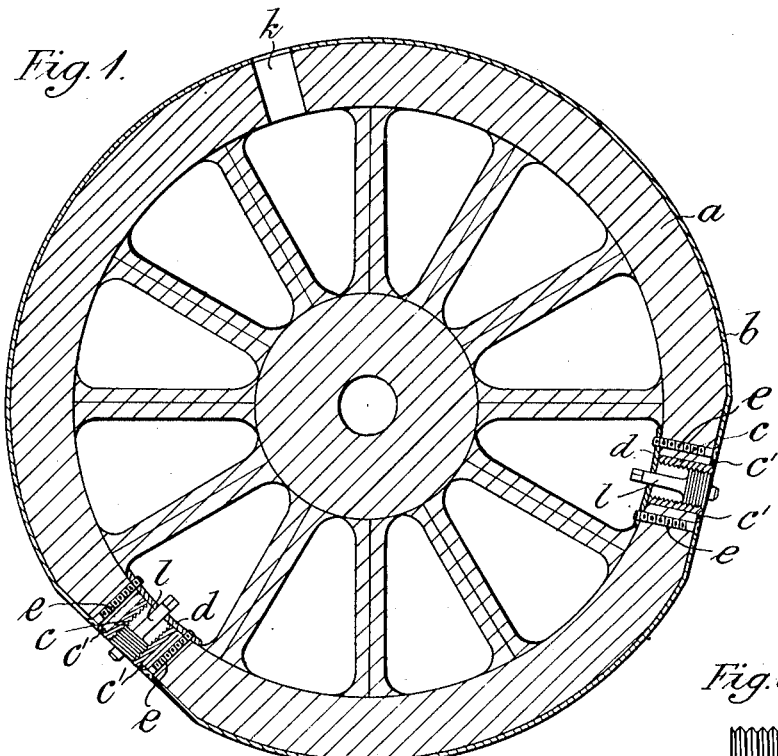
Figure 3:
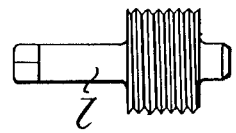
Figure 2:
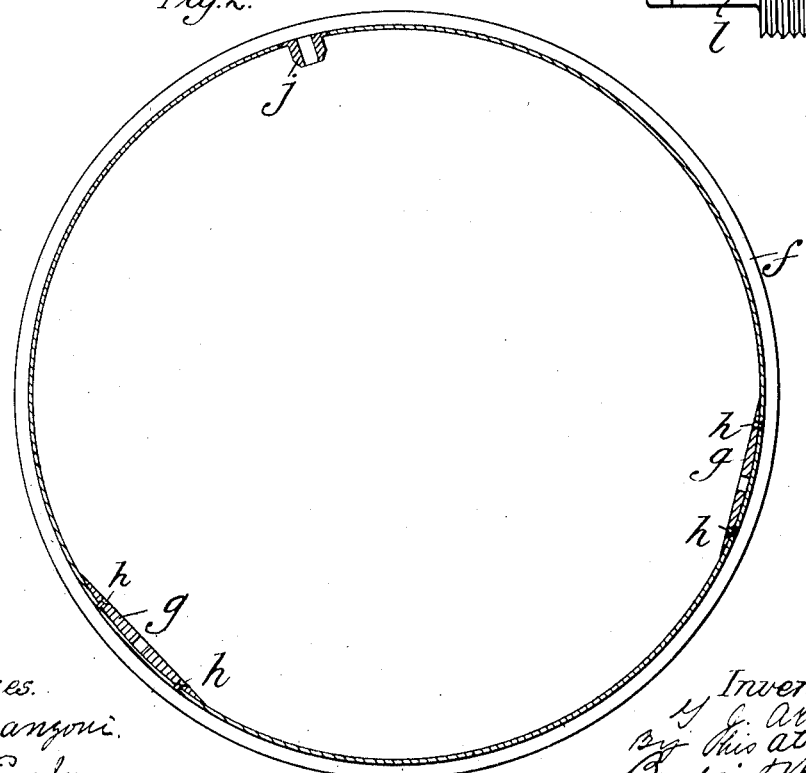

Figure 1 is a sectional elevation of a wheel (without the rim) constructed according to this invention and Fig. 2 is a sectional elevation of a detachable rim adapted to fit onto this wheel. Fig. 3 is a detached view of the bolt $l$ to a larger scale.

$a$ is a wooden felly and $b$ is a metal band shrunk on to it.

$c, c$ are sleeves passing through the felly $a$ and secured in countersunk holes in the band $b$ by screws $c'$ and further secured by plates $d$ fixed inside the felly by through bolts $e$.

$f$ is a detachable rim of any ordinary description and $g, g$ are plates secured inside it by rivets $h$.

$j$ is a nozzle fixed inside the rim.

To mount the detachable rim, the nozzle $j$ is first made to enter the hole $k$ in the felly. The rim is then pushed on to the wheel, the plates $g$ being arranged to register with the flats on the periphery of the felly. The bolts $l$ in the sleeve $c$ are then tightly screwed up, whereby the shoulders on the bolts (clearly shown in Fig. 3) come against plates $g$ and force them somewhat apart from the felly to an extent dependent on the force used and the elasticity of the rim and wheel. The ends of the bolts which enter the holes in the plates should be of insufficient length to reach the rim as it is important that the ends of the bolts, which are preferably slightly tapered, should be free in the holes and not in contact with the inner surface of the rim. It will therefore be seen that the pressure exerted by screwing up the bolts is distributed to the rim throughout the whole of the curved surface of the plates $g$ and further, the greater the pressure exerted by the bolts the greater will be the adhesion of the detachable rim to the wheel in the parts of the circumference of the wheel distant from the bolts.

The bolts are prevented from becoming unscrewed during the use of the wheel by the continuous elastic pressure on their shoulders which being transmitted to the threads engaged increases the frictional resistance to a sufficient extent.

It will be observed that when the bolts are screwed up, the rim is to a limited extent altered from its original circularity. It will be further obvious that not only is this an exceedingly quick and secure method of securing the detachable rim to the wheel but that it is too, equally quick in operation when it is desired to dismount the rim.

Should rust form between the rim and the wheel, difficulty does not arise in dismounting the rim, as the moment the bolts are unscrewed, the rim springs back into its original circular form and breaks the union caused by the rust between the two surfaces.

Preferably as shown only two flats situated 120° apart are provided as the two bolts in conjunction with the nozzle $j$ are quite sufficient to securely keep the rim in place.

The bolts $e$ may be replaced by rivets and the term "bolts" in the claim is intended to include both.

Although the term "flats" has been used it will be understood that they need not necessarily have plane surfaces but depressions of other forms below the circular outline of the band or the felly may be employed so long as their outer surfaces are convex.

What I claim is:

The combination of a wooden felly having flats upon it, a metal band closely surrounding the felly and having flats upon it in contact with the flats on the felly, a detachable rim fitting on to the band, segmental blocks provided with holes fixed inside the rim and filling the space between it and the flats on the band, screw-threaded sleeves passing through the felly and the band, and bolts screwing into the sleeves and engaging the holes in the blocks.

GILBERT JAMES ARNOLD.

Witnesses:
W. J. HANNAM,
A. G. HARDING.